Patented May 25, 1937

2,081,236

UNITED STATES PATENT OFFICE 2,081,236

CHLORINATED HYDROCARBON IN NON-CAKING POWDERED FORM

Wilbie S. Hinegardner, Niagara Falls, N. Y., assignor to E. I. du Pont de Nemours & Company, Wilmington, Del., a corporation of Delaware No Drawing. Application September 11, 1934, Serial No. 743,618

2 Claims. (Cl. 23—250)

This application relates to a process by which powdered and granular substances may be prevented from caking and to the novel compositions of matter resulting therefrom. More particularly, it is concerned with preventing the solid volatile chemicals, paradichlorbenzene and hexachlorethene, from caking when prepared or stored in powdered or finely ground form.

The chlorinated hydrocarbons, paradichlorbenzene, $C_6H_4Cl_2$, and hexachlorethane, $C_2Cl_6$, are normally solid products and are frequently sold commercially in finely ground crystalline form. When these materials are packed for sale or shipment, and stored for several weeks or months before use, it has been found that they tend to cake, the granules cohering together, thereby forming a solid caked mass. An object of this invention is to add to paradichlorbenzene and hexachlorethane substances which will prevent these chlorinated hydrocarbons from caking on standing.

Both paradichlorbenzene and hexachlorethane are used commercially for insecticidal, moth repelling, and antiseptic purposes. Thus paradichlorbenzene is a well-known deodorant and is used in washrooms, urinals and toilets generally in solid or cake form, for this purpose. Hexachlorethane possesses generally similar properties. In practice, it is usual for manufacturers to mold paradichlorbenzene and hexachlorethane by the application of pressure into blocks for sale commercially and as a general rule, it has been found that the finely ground powdered chemicals mold more satisfactorily than those comprising granules of large size. However, as a result of the decided tendency of these chemicals when finely ground to cake upon standing, manufacturers engaged in molding these products have generally avoided using the more finely ground materials in favor of the less desirable for molding, but more desirable for storing, more coarsely ground chemicals. This invention makes it possible for users to employ more finely ground material without any danger of caking on standing.

I have found that the addition of a small amount of finely ground paraformaldehyde, known as "paraform" in commerce, or other formaldehyde polymer, such as the polyoxymethylenes, to paradichlorbenzene and hexachlorethane will prevent these chemicals from caking when finely ground, when the mixtures are permitted to stand in storage for reasonably long periods of time either before or after sale and prior to their commercial use for molding or other purpose. Paraformaldehyde is the polymer resulting when an aqueous solution of formaldehyde is evaporated to dryness under reduced pressure or evaporated by some equivalent means. The polyoxymethylenes are those relatively insoluble polymers or mixtures of polymers which result when formaldehyde is treated with an acid or base which acts as a catalytic agent. While finely ground paraformaldehyde is the preferred addition agent to prevent caking, I have found it possible to use the less soluble polymers of formaldehyde, such as finely ground polyoxymethylenes as anti-caking agents.

The addition of 5 to 10% of finely ground paraformaldehyde to paradichlorbenzene or hexachlorethane in crystalline form and of a fineness capable of passing a 60 mesh screen or even finer, will prevent these chemicals from caking when stored for periods of time of considerable length. Usually, a much smaller quantity of finely ground paraformaldehyde is sufficient. Thus, 1 to 2% of paraformaldehyde by weight, based on the weight of the paradichlorbenzene and hexachlorethane, is ordinarily sufficient and will in all cases prevent caking of these chemicals if they comprise particles of a fineness sufficient to pass a 40 mesh screen but to be retained on 60 mesh screen. My observation has been that for reasonably long periods of time, at least up to three months or beyond, caking can be avoided by the addition of finely ground paraformaldehyde in the amounts indicated.

The advantage of using a relatively small amount of paraformaldehyde, i. e., 2% or below, as an anti-caking agent resides primarily in the fact that these small amounts of paraformaldehyde evaporate with the chlorinated hydrocarbon at substantially the same rate of volatilization. As a general rule, the deodorant, disinfectant, moth repellant, or other insecticidal action of paradichlorbenzene and hexachlorethane depends on the property of these compounds to volatilize. Thus, when molded into cakes, such as used in toilet installations, or in balls as used in moth repellants, these chlorinated hydrocarbons gradually volatilize while exercising their desired action until finally they disappear. Although the rate of volatilization of paraformaldehyde is much less than that of either of these chemicals, when it is present in amounts of 2% or below by weight, based on the weight of the chlorinated hydrocarbon, it will volatilize at substantially the same rate as the chlorinated hydrocarbon and thus leave behind no paraformaldehyde residue.

When 5 to 10% of paraformaldehyde is added to paradichlorbenzene or hexachlorethane, the addition agent will not volatilize at the same rate as the chlorinated hydrocarbon but will gradually accumulate therein, volatilizing at a lower rate than the main chemical. This, however, is ordinarily not objectionable in many uses for even though there may be left behind a residue of paraformaldehyde, it will slowly evaporate.

In those circumstances in which the deodorant and disinfectant action of the compound is utilized by its immersion in water, it is possible to add any desired quantity of paraformaldehyde to paradichlorbenzene or hexachlorethane because paraform is appreciably soluble in water. In fact, it is so much more soluble in water than the chlorinated hydrocarbons that it may be advantageous to use polymers of formaldehyde, such as the polyoxymethylenes which are much less soluble than paraformaldehyde. While the polyoxymethylenes, or the mixture of polymers produced by treatment of formaldehyde in aqueous solution with an alkali or an acid, are slightly soluble in water, they are not as soluble as paraformaldehyde.

While, as previously pointed out, it is advantageous under some circumstances to employ 2% or less of finely ground paraformaldehyde as an anti-caking agent for these powdered granular chlorinated hydrocarbons, it may be advisable under some circumstances, to use a higher concentration of finely ground paraformaldehyde in the powdered chlorinated hydrocarbon. This is the case when it is desired to improve materially the antiseptic properties of the chlorinated hydrocarbon because paraformaldehyde possesses a strong germicidal and bactericidal action and its addition to the compounds will enhance their antiseptic actions. While not particularly desirable in the manufacture of moth repellants, it may be advantageous under other circumstances to use larger amounts of paraformaldehyde when the molded chlorinated hydrocarbons are used in installations where advantage is taken of their deodorizing or insecticidal action. Thus, I may add up to 30% of finely ground paraformaldehyde by weight, based on the weight of the chlorinated hydrocarbon, to paradichlorbenzene or hexachlorethane and until that figure is reached, the odor of paraformaldehyde is not noticeable in the product.

It is to be understood that this invention is not restricted to the use of any precise amounts but resides solely in the use of finely ground polymers of formaldehyde, such as paraformaldehyde and the polyoxymethylenes, as anti-caking agents for powdered paradichlorbenzene and hexachlorethane, and as anti-caking agents for use in other volatile materials where the anti-caking action of these volatile polymers may be desirable. As illustrative of the use of these materials to prevent caking of finely ground materials upon standing, the following examples may be given:

Example 1

Commercial paradichlorbenzene was ground by hand in a mortar and graded by sieving into the following grades:

(a) That portion passing a 15 mesh and retained on a 30 mesh screen.
(b) That portion passing a 30 mesh and retained on a 40 mesh screen.
(c) That portion passing a 40 mesh and retained on a 60 mesh screen.
(d) That portion passing a 60 mesh screen.

Each of these grades was divided into a number of samples and paraformaldehyde was added in the amounts indicated in the following table. One sample of each grade was allowed to stand as a "control" without addition of paraformaldehyde.

After standing 2 days, 8 days, and 63 days, the products were examined in order to determine whether any of them had caked. The condition of the samples at the end of the respective test periods is indicated by symbols, the plus marks indicating that the products had caked while the minus marks indicated lack of caking. The legend gives full information as to the quantitative meaning of the symbols.

| Sample | Approximate particle size in mesh of screen | Condition after number of days indicated | | |
|---|---|---|---|---|
| | | 2 days | 8 days | 63 days |
| Paradichlorbenzene — no paraformaldehyde. | 15-20 | + | ++ | +++ |
| Paradichlorbenzene plus 5% paraformaldehyde. | 15-20 | --- | --- | --- |
| Paradichlorbenzene plus 10% paraformaldehyde. | 15-20 | --- | --- | --- |
| Paradichlorbenzene — no paraformaldehyde. | 30-40 | ++ | +++ | +++ |
| Paradichlorbenzene plus 1% paraformaldehyde. | 30-40 | --- | --- | -- |
| Paradichlorbenzene plus 2% paraformaldehyde. | 30-40 | --- | --- | --- |
| Paradichlorbenzene plus 5% paraformaldehyde. | 30-40 | --- | --- | --- |
| Paradichlorbenzene plus 10% paraformaldehyde. | 30-40 | --- | --- | --- |
| Paradichlorbenzene — no paraformaldehyde. | 40-60 | ++ | +++ | +++ |
| Paradichlorbenzene plus 1% paraformaldehyde. | 40-60 | --- | -- | -- |
| Paradichlorbenzene plus 2% paraformaldehyde. | 40-60 | --- | --- | --- |
| Paradichlorbenzene plus 5% paraformaldehyde. | 40-60 | --- | --- | --- |
| Paradichlorbenzene — no paraformaldehyde. | Finer than 60. | +++ | +++ | +++ |
| Paradichlorbenzene plus 1% paraformaldehyde. | Finer than 60. | -- | -- | - |
| Paradichlorbenzene plus 2% paraformaldehyde. | Finer than 60. | --- | --- | -- |
| Paradichlorbenzene plus 5% paraformaldehyde. | Finer than 60. | --- | --- | -- |
| Paradichlorbenzene plus 10% paraformaldehyde. | Finer than 60. | --- | --- | --- |

*Legend*
The signs used have the following meanings:
+ Adherence, but broken by jarring inverted tube, no lumps remain on shaking tube.
+ + Firm adherence, broken only by sharp jarring of inverted tube and usually not completely separating to original crystals.
+ + + Very firm adherence, not broken by jarring, striking or shaking the inverted tube.
− Adherence, but easily separated by jarring inverted tube or slightly shaking tube.
− − Very slight adherence, requiring a slight jar to start flow in the inverted tube.
− − − No adherence, flows freely on inverting tube.

Example 2

Commercial hexachlorethane was ground so as to pass a 20 mesh screen and still be retained on a 40 mesh screen. It was then divided in six portions or samples. To one portion of this hexachlorethane, no paraformaldehyde was added; to the remaining five portions, paraformaldehyde in the amounts indicated in the following table was added. The products were allowed to stand first for 15 hours, and then for 70 days. At the end of each period of standing, the samples were investigated to determine evidences of caking. The results are tabulated below:

*Effect of finely ground paraformaldehyde on caking of powdered hexachlorethane*

| Percent of paraformaldehyde | Condition after 15 hours | | Condition after 70 days | |
|---|---|---|---|---|
| | Sample A | Sample B | Sample A | Sample B |
| 0.00 | + | + | +++ | ++ |
| 0.50 | − | − | + | ++ |
| 1.00 | −− | −− | − | ± |
| 2.00 | −−− | −−− | −− | −− |
| 5.00 | −−− | −−− | −−− | −−− |
| 10.00 | −−− | −−− | −−− | −−− |

Legend

The signs used have the following meanings:
+ Adherence, but broken by jarring inverted tube, no lumps remain on shaking tube.
++ Firm adherence, broken only by sharp jarring of inverted tube and usually not completely separating to original crystals.
+++ Very firm adherence, not broken by jarring, striking or shaking the inverted tube.
− Adherence, but easily separated by jarring inverted tube or slightly shaking tube.
−− Very slight adherence, requiring a slight jar to start flow in the inverted tube.
−−− No adherence, flows freely on inverting tube.

It is evident that paradichlorbenzene and hexachlorethane in finely ground powdered form have been prevented from caking for test periods up to 70 days by the addition thereto of finely ground paraformaldehyde. The same is true of the polymers, derived by polymerization of formaldehyde, known as the polyoxymethylenes when present in either of these chlorinated hydrocarbons. It is also obvious that various changes may be made in the specific treatments outlined in the examples without departing from the purview of my invention.

I claim:

1. A new non-caking composition of matter comprising a chlorinated hydrocarbon selected from the group which consists of paradichlorbenzene and hexachlorethane in powder form containing a sufficient amount of a polymer of formaldehyde to inhibit caking of the mixture.

2. A new non-caking composition of matter comprising a chlorinated hydrocarbon in powder form selected from the group consisting of paradichlorbenzene and hexachlorethane containing a polymer of formaldehyde selected from the group which consists of paraformaldehyde and that polymer mixture which is known as the polyoxymethylenes, the amount of said polymer being sufficient to inhibit caking of the resultant mixture.

WILBIE S. HINEGARDNER.